United States Patent [19]
Aslan

[11] 3,789,299
[45] Jan. 29, 1974

[54] PROBE FOR RADIATION DETECTOR
[75] Inventor: Edward E. Aslan, Plainview, N.Y.
[73] Assignee: The Narda Microwave Corporation, Plainview, N.Y.
[22] Filed: Nov. 5, 1971
[21] Appl. No.: 196,088

Related U.S. Application Data
[62] Division of Ser. No. 848,620, Aug. 8, 1969, Pat. No. 3,641,439.

[52] U.S. Cl.................... 324/95, 324/106, 343/703, 343/796
[51] Int. Cl......................... H01q 21/20, C01r 5/22
[58] Field of Search ...... 343/703, 796; 324/106, 95; 325/363

[56] References Cited
UNITED STATES PATENTS
| 2,430,664 | 11/1947 | Bradley | 343/703 |
| 2,365,207 | 12/1944 | Moles | 343/703 |
| 3,411,111 | 11/1968 | Meyers | 343/787 |

Primary Examiner—Eli Lieberman
Attorney, Agent, or Firm—Eisenman, Allsopp & Strack

[57] ABSTRACT

An elongated probe of materials having free space characteristics, supports, and antenna means at one end and conducting means aligned with its major axis for interconnection with an appropriate metering device.

13 Claims, 5 Drawing Figures

PATENTED JAN 29 1974 3,789,299

PROBE FOR RADIATION DETECTOR

CROSS-REFERENCE TO RELATED APPLICATION

This is a division of co-pending patent application Ser. No. 848,620, filed Aug. 8, 1969, now U.S. Pat. No. 3,641,439.

BACKGROUND OF THE INVENTION

1. Field of the Invention

This invention relates to high frequency power density measurements; and more particularly relates to the measurement of high frequency, or microwave, power density with portable instruments.

The increasing use of microwave energy for such purposes as consumer and industrial heating ovens, has placed possibly dangerous microwave energy sources in close proximity to large numbers of inexperienced people. It is essential that units utilizing microwave energy include proper shielding in order to avoid endangering those in close proximity thereto. In order to continually monitor the effectiveness of any shielding provided, and in order to initially insure its proper installation, radiation detectors must be provided to measure any leakage radiation that may appear. The necessary measurements of the radiated power should be made in close proximity to the units being tested and yet the measuring instrument should not perturb the field. Such measurements should preferably be independent of the polarization of the incident energy field and independent of ambient temperature and infrared radiation. Furthermore, it is of importance that the monitoring device or instrument be completely reliable inasmuch as such radiation is not apparent with the use of the normal human faculties.

2. Description of the Prior Art

It has been known that thin film thermocouple elements may be used to terminate a transmission line. When connected this way, the thermocouple will be heated by an amount proportional to the power dissipated therein. This heating effect creates a voltage across the thermocouple and the value of the voltage is a direct indication of the amount of power absorbed by the thermocouple. These characteristics of thermocouples have made them a basic element in the measurement of radio frequency power.

Thermistors or bolometers have also been used to measure radio frequency power. In some applications, for example, such elements are positioned in one leg of a bridge circuit so that the power required to maintain the bridge in balance is an indication of the amount of power absorbed by the thermistor. Crystal arrangements have also been employed to indicate power density. It is known that crystals have a square law characteristic which makes them adequate for monitoring relatively low power densities.

Most measurements of microwave power are made within wave guides wherein the detecting element or elements can be designed and selectively positioned in order to avoid reflection of the power and wherein the environment of the detecting elements can be carefully controlled. There are no known satisfactory probes which can be used in free space to measure microwave radiation in the near field or Fresnel region, without disturbing the field.

SUMMARY OF THE INVENTION

The present invention relates to a completely portable detector effective to detect and measure microwave radiation leakage of elements such as microwave ovens, heaters, driers, medical equipment, and the like.

At the present time, 915 MHz and 2450 MHz are the frequencies most commonly used in the type of equipment mentioned. These frequencies have been assigned by the Federal Communications Commission for industrial, medical, and scientific devices and are the only two frequencies being used for consumer ovens. Preferably, any detector should be designed for optimum operation within a prescribed frequency range and such a range may not encompass both of the mentioned frequencies. Thus, the probe of the present invention provides means for adapting a basic instrument for optimum operation over a variety of preselected ranges.

An object of the present invention is to provide a portable radiation detector.

Another object of the invention is to provide a portable radiation detector having minimum perturbation effects upon the field being examined.

A further object of the present invention is to provide a portable microwave detector that is operable close to the source of possible radiation.

Another object of the invention is to provide a portable microwave detector easily adaptable to measurement of a variety of frequencies.

Another object of the present invention is to provide means for inserting radiation detecting elements into a microwave field without perturbing the field.

In accordance with one aspect of the invention there is provided a probe for a radiation detector that is suitable for supporting sensing means which are responsive to an electromagnetic field. This probe comprises substantially straight elongated means, means for mounting the sensing elements at one end thereof, and electrically conductive means substantially aligned with the major axis of the elongated means and connected with the sensing means.

A more thorough understanding of the invention, along with a better appreciation of the objects and novel features thereof, will be available following a consideration of the following description which is made in conjunction with the attached drawings.

DESCRIPTION OF THE PREFERRED EMBODIMENT

Figure 1:
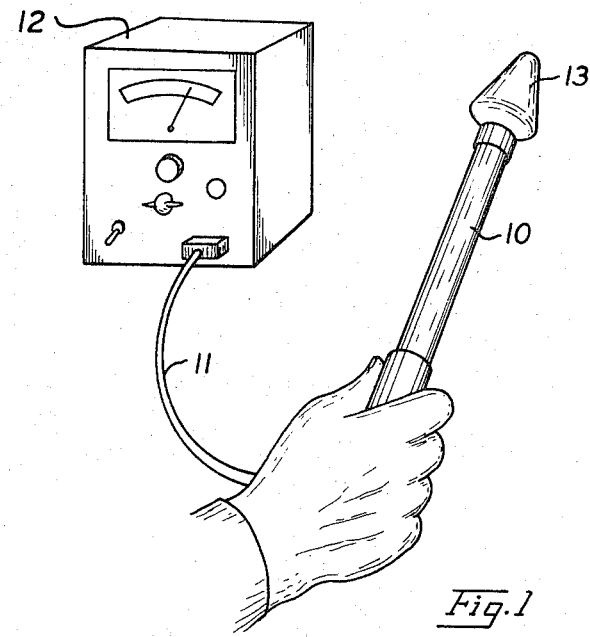
FIG. 1 illustrates an embodiment of the invention comprising the unique hand-held probe and an indicating device.

FIG. 1 illustrates the major components of a radiation detector embodying the present invention. These components include the hand-held probe 10 having an antenna or spacer member 13. The probe is connected by a coaxial cable 11 to an electronic voltmeter 12. Typically, probe 10 may be tubular in shape, 12 inches long, and approximately three-fourth of an inch in diameter. Spacer 13 is made of material having free space characteristics and is generally designed to permit positioning of the end of probe 10 2 inches from the source of radiation. It may be conical in configuration; the rear surface being perpendicular to its axis and being adapted under certain conditions to mount extending antenna portions.

Figure 2:
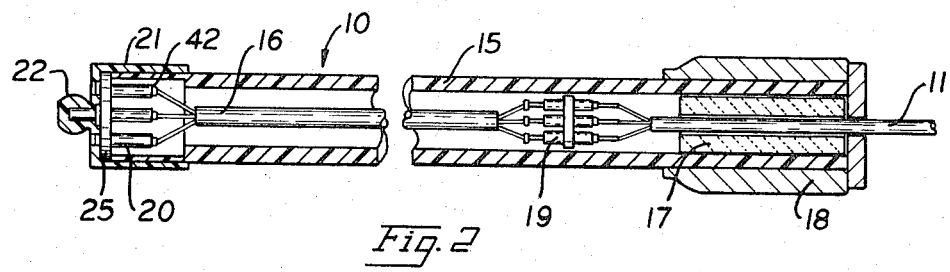
FIG. 2 is a cross-sectional view taken along the longitudinal axis of a probe embodying the invention.

The cross-sectional view of probe 10, shown in FIG. 2, illustrates the interconnection of the thermocouple elements to the coaxial cable 16 at the front end of the probe. The head of the probe includes a projection 22 adapted to serve as an anchoring or mounting element for spacer-adapter 13. This mounting element may preferably be a projection from cap portion 21 which encircles the barrel 15. In the illustrative embodiment, thermocouple elements 23, 24 make up the sensor assembly 25. Lead sockets 42 couple sensor assembly 25 to four separate conductors of a cable 16. Ferrite beads 20 isolate R.F. from cable 16. A half wave length from the sensor assembly, four R.F. by-pass feed through capacitors 19 interconnect cable 16 with output cable 11. Thus, cable 11 presents to the electronic voltmeter 12, a voltage proportional to the R.F. power impinging upon the sensor assembly.

The handle of probe 10 includes an outer tubular element 18 and an inner coaxial tube of lossey ferrite material surrounding cable 11. Typically, this surrounding tube 17 offers 30 db of attenuation at the expected frequency of probe operation. It will be seen that the lead wires 11 which carry the direct current output of the thermocouple are shielded with aluminum or other suitable materials and further that they are maintained perpendicular to the plane of the sensor assembly 25. This orientation of the lead wires makes them essentially invisible to the propagated wave when the antenna is placed parallel to the phase front.

Figure 3:
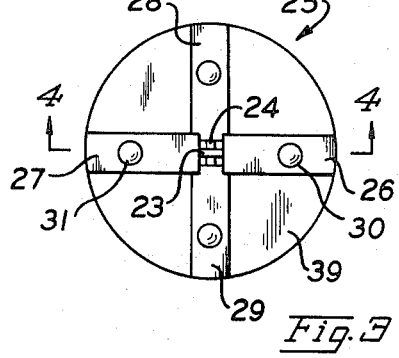
FIG. 3 is a top view of an illustrative sensor assembly adapted for mounting upon the probe illustrated in FIG. 2.

With reference to FIG. 3, it will be noted that the illustrated sensor assembly 25 includes orthogonally disposed thermocouple elements 23 and 24 connected to antenna conductor strips 26, 27 and 28, 29, respectively. The antenna strips are in turn mounted upon a suitable substrate 39 which is adapted for mounting at the end of the probe 10. The particular manner of mounting is not germane to the invention, although the assembly must be substantially orthogonal to the axis of the probe.

Figure 4:
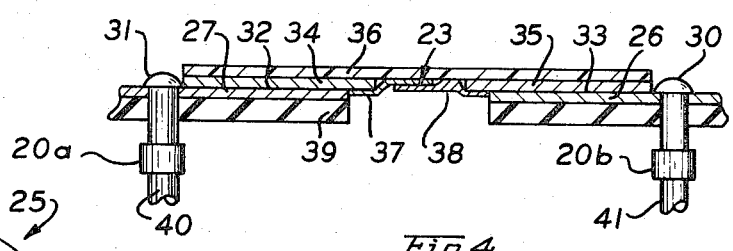
FIG. 4 is an elevation view of a cross-section taken through the sensor assembly shown in FIG. 3.

FIG. 4 shows in somewhat greater detail the actual assembly of a single thermocouple and the manner in which it is mounted upon substrate 39. The illustrated assembly is secured in position and connected to two of the lead-out wires forming cable 16 by means of connectors 30 and 31. A second thermocouple, of substantially identical construction, may be mounted orthogonally to that shown in FIG. 4 and thereby complete the general assembly illustrated in FIG. 3.

It is important to note that the dimensions in the drawing have been chosen for clarity of illustration and should not be used to suggest the relative sizes of the various elements.

Figure 5:
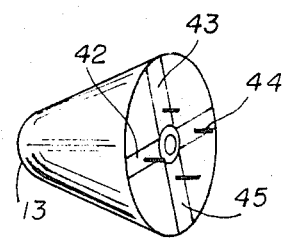
FIG. 5 is a perspective view showing the rear of a spacing cone having antennas thereon.

In essence, the sensor assembly comprises a detector, i.e., the thermocouple, and an antenna, i.e., films 34, 35. Various types of detectors might be employed. The particular frequency being monitored determines the length of the antenna, which is a small fraction of the wave length at that frequency. By maintaining the antenna of small size, the unit is capable of measuring and monitoring power density with a minimum of field perturbation. In one embodiment of the invention, wherein the probe is used for measuring energy in the 2,450 MHz range, the antenna strips have a combined length of approximately three-fourth of an inch. The conical spacer-antenna 13 is attachable to the end of probe 10 in order to provide accurate spacing from a source of radiation leakage and simultaneously provides mounting means for antenna extensions. Thus, for frequencies in the 915 MHz range, the rear face of cone 13 contains orthogonally disposed conductive strips 42, 43, 44, 45 which connect to strips 26–29 of sensor assembly 25 and provide an antenna length of approximately 2 inches. Suitable pin-type connectors may be used for this purpose. FIG. 5 illustrates such antenna conductors on a cone.

The output leads from the thermocouples 23, 24, or other sensing elements are connected in series to the indicating unit 12. When the sensing elements on the sensor assembly 25 are perpendicular to each other and illustrated, the total direct current output voltage is independent of probe orientation and field polarization about the axis of the probe. In the embodiment shown, each antenna is terminated in an element that produces a direct current output proportional to the square of the electric field intensity component parallel thereto. The sum of these outputs is proportional to the power density and independent of orientation because of this square law characteristic of the thermocouple.

A specific radiation detector and probe assembly has been described. It will be appreciated that variations and modifications in this radiation detector may be conceived by those skilled in the art. All such variations and modifications coming within the scope of the disclosure and the appended claims, are intended to be covered by these claims.

What is claimed is:

1. A high frequency radiation detector assembly comprising first and second antennas arranged in a substantially common plane responsive to a radiated electric field each to produce a respective radio frequency electric current commensurate with the strength of said field and each mounted on one end of a substantially straight elongated non-conductive means, electrically conductive means disposed orthogonally to said antennas extending through and substantially aligned with the major axis of said elongated means and connected to said antennas, and first and second sensing means each coupled to a respective antenna and each mounted at said one end, each sensing means being responsive to the respective said radio frequency electric current to produce a commensurate direct current potential.

2. A radiation detector assembly as defined in claim 1, including spacing means of predetermined length and having free space characteristics, and means for mounting said spacing means on said one end between said antennas and the source of said electric field.

3. The combination defined in claim 2, wherein said spacing means is removably mounted on said probe, including further spacing means having free space characteristics connectable to said probe, and further antenna means mounted on said further spacing means adapted to respond to an electromagnetic field of different frequency.

4. A radiation detector assembly as defined in claim 1, wherein said electrically conductive means includes by-pass capacitors located approximately one-half wavelength from said antennas.

5. A radiation detector assembly as defined in claim 4, including ferrite means in proximity to the sensing means and effective to isolate said electrically conductive means from said electric field.

6. A radiation detector assembly as defined in claim 5, including ferrite means disposed at the end of said non-conductive means remote from said sensing means and effective to isolate said conductive means from said electric field.

7. A radiation detector assembly as defined in claim 1, wherein said antennas comprise dipoles.

8. A radiation detector assembly as defined in claim 1, wherein each antenna and sensing means comprises elements disposed substantially within a plane extending orthogonally from said major axis.

9. A radiation detector assembly according to claim 1, wherein each antenna and sensing means is elongate and said second antenna and second sensing means are disposed at right angles to the first antenna and sensing means.

10. A radiation detector assembly according to claim 1, wherein said electrically conductive means couple said sensing means to a meter responsive to the amount of voltage generated therein.

11. A radiation detector assembly as defined in claim 1, wherein each antenna and sensing means is elongate and has its major axis orthogonal to the major axis of said non-conductive means.

12. A radiation detector assembly as defined in claim 1, wherein each antenna and sensing means is elongate and the first antenna is aligned with the first sensing means and disposed at an angle to the second antenna which is aligned with the second sensing means.

13. A radiation detector assembly as defined in claim 1, wherein said first and second antennas are disposed in substantially the same planes as the first and second sensing means, respectively.

* * * * *

Disclaimer

3,789,299.—*Edward E. Aslan*, Plainview, N.Y. PROBE FOR RADIATION DETECTOR. Patent dated Jan. 29, 1974. Disclaimer filed June 30, 1980, by the assignee, *Narda Microwave Corporation*.

The term of this patent subsequent to Feb. 8, 1989 has been disclaimed.

[*Official Gazette November 25, 1980.*]